United States Patent Office 3,100,652
Patented Aug. 13, 1963

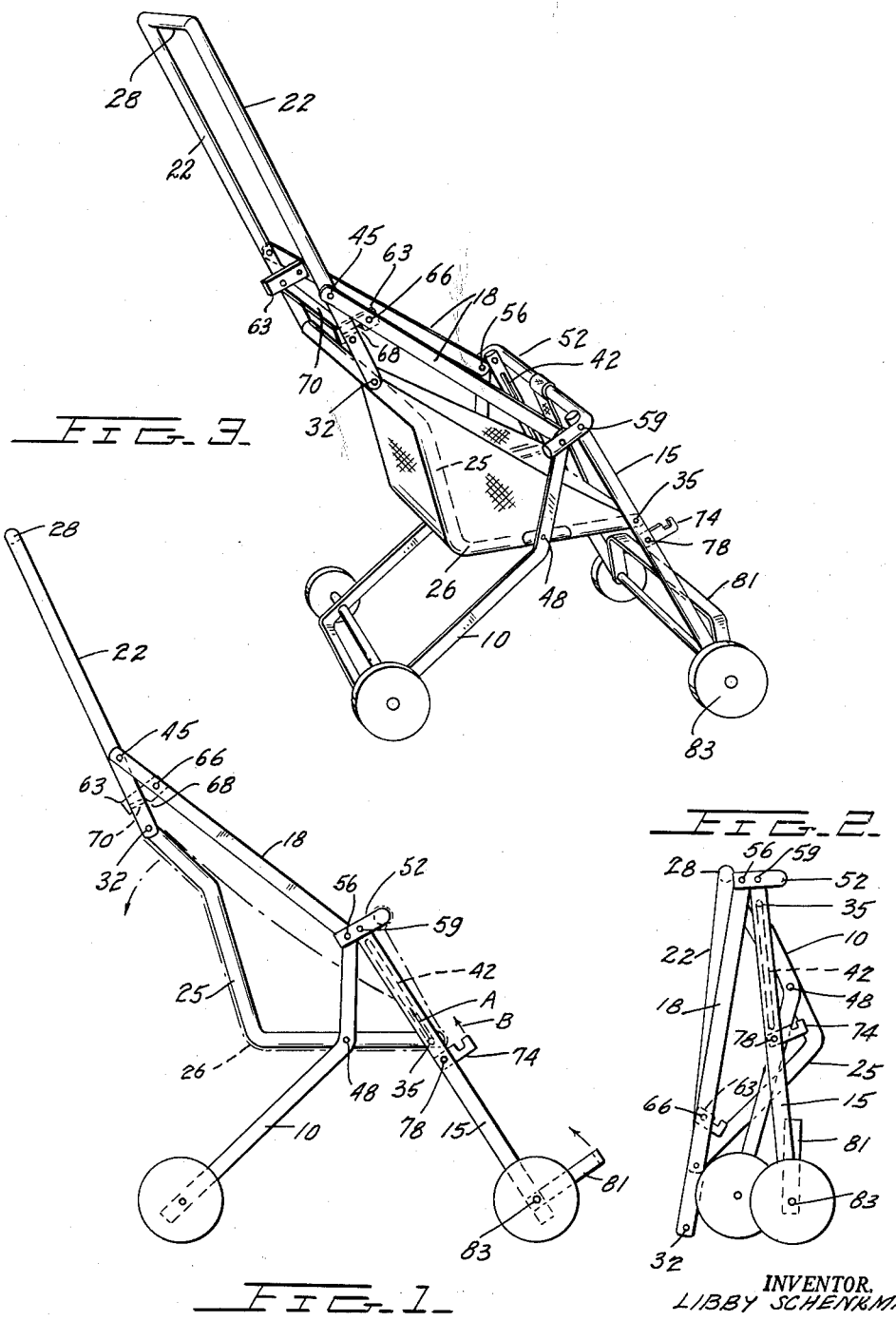

3,100,652
FOLDABLE BABY STROLLER
Libby Schenkman, 2426 9th Ave., Greeley, Colo.
Filed Dec. 21, 1960, Ser. No. 77,383
6 Claims. (Cl. 280—41)

This application relates to strollers and more particularly to a stroller of the foldable type, improved as regards simplicity, reference being made to my Patent No. 2,989,318.

It is an object of the invention to provide a stroller structure which may be readily folded or unfolded and locked in erected condition.

It is another object of the invention to provide a stroller structure which will be compact in folded condition, and sturdy and reliable in set up condition.

It is another object of the invention to provide a foldable stroller construction which may be made primarily of commercially obtainable parts such as steel aluminum tubing and fastenings, with a minimum of special tooling.

It is a still further object of the invention to provide a stroller which requires no skill or manual dexterity for either collapsing or setting up.

Other objects and features of the invention will be apparent from the description that follows, taken in conjunction with the appended drawings, in which:

FIGURE 1 shows the stroller in set up condition, in elevation;

FIGURE 2 shows the stroller in folded condition;

FIGURE 3 is a perspective of the erected stroller.

Referring now to FIGURES 1 and 2, the invention comprises a pair of legs 10 and 15, the leg 10 being substantially of dog leg shape and the leg 15 being straight. Extending upwardly of the legs, as shown in FIGURE 1, is a side bracing and tensioning framing comprised of the separate parallel bars 18. Also shown is a handle bar framing comprised of the parallel side bars 22 and handle bar 28 extending integrally therebetween.

A rectangular seat frame 25 is pivotally suspended at four points, hereinafter described, supports a foldable canvas seat bag 26 as shown. The legs 10 and 15 terminate at their lower ends in rear and front wheels, respectively, as shown. The erected perspective of FIGURE 3 shows handle elements 22 tied laterally by handle bar 28 extending at the upper extremities of the handle bars 22 and by a tie rod 32 extending laterally between elements 22 and 25 and forming a pivotal junction therefor. An additional rod 35 extends laterally to form a pivotal function for leg elements 15 and seat frame 25 at each side of the construction. Thus, it will be understood that seat frame 25 comprises the side bars so designated and the upper and lower bars 32 and 35 which form the seat-bag supports. The rod 35 extends transversely across and through the seat frame side bars and protrudes at its respective ends into the respective slots 42 of legs 15. Thus, the entire rectangular seat frame may swing with respect to the forward leg frame comprising the legs 15, while at the same time have an extra degree of guided motion with respect thereto by virtue of the riding or sliding of the ends of rod 35 in slot 42 in the direction of arrow A. This is an important feature of the invention since it enables compact folding of the structure comprising the forward leg frame comprised of legs 15, the handle bar frame, the rearward leg frame comprised of legs 10, and the seat frame 25 and allows the stroller to open fully by simply pulling up with one hand or handle bar 28. The folded relationship is as shown in FIGURE 2, and is effected by mixture of additional pivotal construction as hereinafter described.

The construction provides for pivotal articulation such as a respective pivot 45 on each side for pivotally joining respective bars and the side bars of seat support frame 25; an additional pair of pivotal pins 48 for pivotally joining the dog legs 10 and the horizontal side bars (FIGURE 1) of seat frame 25; a respective pivotal link 52 on each side of the construction which pivotally articulates the dog legs 10 and the legs 15, being pivoted to both of there elements at their upper extremities. Thus, the bars 18 are pivoted at their lower extremities to respective link 52 via pins 56, and link 52 is pivoted via pins 59 to legs 15, all in a construction which will be well understood by persons skilled in the art.

In the set up condition shown in FIGURE 1, a respective swivelled lock link 63 pivoted at 66 to each bar 18, on each side of the stroller, is notched as shown at 68 to latch over a bar 70 secured transversely across the structure to the handle bar elements 22. In a similar manner, a locking link 74 may be used alternatively, is pivoted to each leg 15 at 78 and is notched as shown to lockingly engage the rod 35 on each side of the construction. In FIGURE 1, the latch 74 is shown as movable in the direction of the arrow B to engage rod 35.

At the lower end of legs 15, a foot-rest 81 is shown pivoted as by pins 83 to the legs. The foot-rest may be of any simple construction or may consist of a U-shaped bar, the legs of which are pivoted to the legs 15.

It will be noted that in the erected position rod 35 is at the lowermost end of slot 42. In order to collapse the stroller it is only necessary to swing the link 63 or 74 out of latching position and press down with one hand on the handle bar 28 to effect relative pivotal movement of the several components to the position shown in FIGURE 2. In the collapsed condition the rod 35 will be seen to have moved upwardly of legs 15 to the other end of the slot 42 adjacent link 52. The foot-rest 81 is, of course, swung inwardly to effect a more compact structure and the collapsed stroller may now be readily gripped as by the handle bar 28 and carried or stored.

The particular materials from which the stroller may be constructed are, of course, a matter of choice. Steel, aluminum, or possibly even plastic tubing, rods, bars, or other cross-sectional shapes may be utilized. Further, it will be understood that the several frames are of such lateral dimension so as to nest within each other in folded condition. Thus, the rear leg frame comprised of legs 10, as shown in FIGURE 2, is nestable within the forward leg frame comprised of the legs 15, but outwardly of the seat frame 25. Likewise, the handle bar elements 22, forming a handle bar frame along with the handle bar 28, is nestable within the side bar framing, comprised of the side bars 18.

It will be obvious that a carriage or a walker may be constructed along these simplified lines, as well as various pieces of furniture.

Having thus described my invention, I am aware that various changes may be made without departing from the spirit thereof and, accordingly, I no not seek to be limited to the precise illustration herein given except as set forth in the appended claims.

I claim:

1. A foldable stroller comprising a seat frame, a forwardly extended leg frame and a rearwardly extended leg frame, said leg frames being pivoted to each other, one leg frame being pivoted to said seat frame at a relatively fixed pivot, and said other leg frame being pivoted to said seat frame by a slidable pivot, said frames being dimensioned so as to be relatively nestable and being foldable by pivoting and sliding said forwardly extended leg frame with respect to said seat frame, including a handle frame pivotally connected to said seat frame; bar means pivotally connected between said handle frame and said rearwardly extended leg frame and pivotal link means connected between the upper ends of said leg frames.

2. In a stroller as set forth in claim 1, including latching link means carried by said forward leg frame movable into locking engagement with said seat frame.

3. In a device as set forth in claim 1, including a pivotal locking link means carried by said bar means and lockingly engageable with said handle bar frame.

4. A foldable stroller comprising a seat frame, a forwardly extended leg frame and a rearwardly extended leg frame, said leg frames being pivoted to each other, one leg frame being pivoted to said seat frame at a relatively fixed pivot, and said other leg frame being pivoted to said seat frame by a slidable pivot, said frames being dimensioned so as to be relatively nestable and being foldable by pivoting and sliding said forwardly extended leg frame with respect to said seat frame, said slidable pivot comprising a rod extending across said seat frame and having ends extending into respective slots in said forwardly extended leg frame whereby said seat frame may swing with respect to said rearwardly extended leg frame and also with respect to said forwardly extended leg frame and may also have an additional degree of guided motion with said forwardly extended leg frame to effect a nested condition with respect thereto, a foldable stroller including a handle frame pivotally connected to said seat frame; bar means pivotally conntcted between said handle frame and said rearwardly extended leg frame and pivotal link means connected between the upper ends of said leg frames.

5. A foldable stroller comprising a seat frame, a forwardly extended leg frame and a rearwardly extended leg frame, said leg frames being pivoted to each other, one leg frame being pivoted to said seat frame at a relatively fixed pivot, and said other leg frame being pivoted to said seat frame by a slidable pivot, said frames being dimensioned so as to be relatively nestable and being foldable by pivoting and sliding said forwardly extended leg frame with respect to said seat frame, said slidable pivot comprising a rod extending across said seat frame and having ends extending into respective slots in said forwardly extended leg frame whereby said seat frame may swing with respect to said rearwardly extended leg frame and also with respect to said forwardly extended leg frame and may also have an additional degree of guided motion with said forwardly extended leg frame to effect a nested condition with respect thereto, including latching link means carried by said forward leg frame movable into locking engagement with said seat frame.

6. A foldable stroller comprising a seat frame, a forwordly extended leg frame and a rearwardly extended leg frame, said leg frames being pivoted to each other, one leg frame being pivoted to said seat frame at a relatively fixed pivot and said other leg frame being pivoted to said seat frame by a slidable pivot, said frames being dimensioned so as to be relatively nestable and being foldable by pivoting and sliding said other leg frame with respect to said seat frame, including latching link means carried by said forward leg frame movable into locking engagement with said seat frame, including a handle bar frame pivotally connected to said seat frame; bar means pivotally connected between said handle bar frame and said rearwardly extended leg frame and pivotal link means connected between the upper ends of said leg frames, and pivotal locking link means carried by said bar means and lockingly engageable with said handle bar frame.

References Cited in the file of this patent
UNITED STATES PATENTS

| | | |
|---|---|---|
| 2,407,779 | Grove | Sept. 17, 1946 |
| 2,498,935 | Woods | Feb. 28, 1950 |
| 2,506,601 | Kelch | May 9, 1950 |